(12) United States Patent
Riddiford et al.

(10) Patent No.: US 6,709,073 B2
(45) Date of Patent: Mar. 23, 2004

(54) CONTROL COMMAND MODIFICATION TO MINIMIZE SATURATION EFFECTS FOR CONTROLLED FORCE APPLICATION

(75) Inventors: Bryan P. Riddiford, Dayton, OH (US); Richard J. Thomas, Kettering, OH (US)

(73) Assignee: Delphi Technologies, Inc., Troy, MI (US)

( * ) Notice: Subject to any disclaimer, the term of this patent is extended or adjusted under 35 U.S.C. 154(b) by 52 days.

(21) Appl. No.: 10/004,240

(22) Filed: Nov. 1, 2001

(65) Prior Publication Data

US 2003/0080615 A1 May 1, 2003

(51) Int. Cl.$^7$ ................................................ B60T 8/42
(52) U.S. Cl. ..................................... 303/115.2; 303/162
(58) Field of Search .......................... 310/80; 417/415, 417/416; 303/113.4, 155, 162, DIG. 1, DIG. 2, DIG. 3, DIG. 4, 115.2, 3, 15, 20; 188/156, 157

(56) References Cited

U.S. PATENT DOCUMENTS

| | | | |
|---|---|---|---|
| 4,835,695 A | * 5/1989 | Walenty et al. ............. 303/162 |
| RE33,663 E | * 8/1991 | Kade et al. ................. 303/162 |
| 5,071,199 A | * 12/1991 | Spadafora et al. ..... 303/DIG. 4 |
| 5,312,172 A | * 5/1994 | Takeuchi .................. 303/113.1 |
| 6,305,758 B1 | * 10/2001 | Hageman et al. ........ 303/115.2 |
| 6,371,256 B2 | 4/2002 | Disser |
| 6,371,574 B1 | * 4/2002 | Hageman et al. ......... 303/113.4 |
| 6,397,981 B1 | * 6/2002 | Tamasho et al. ........... 188/71.9 |
| 6,422,659 B2 | 7/2002 | Disser |
| 6,456,921 B1 | 9/2002 | Bodie et al. |
| 6,464,308 B2 | * 10/2002 | Kubota ......................... 303/20 |

* cited by examiner

*Primary Examiner*—Matthew C. Graham
(74) *Attorney, Agent, or Firm*—Scott A. McBain

(57) ABSTRACT

A force generating apparatus for providing a force to a moving element based upon receipt of an electrical force signal includes a force applying element coupled to the moving element for applying the force to the moving element and an actuator coupled to the force applying element for actuation thereof in response to receiving the electrical force signal. The force generating apparatus further includes a controller for determining when the force apply element is in an apply mode, determining the elapsed time until reversion to a normal mode, determining when the elapsed time is greater than a predefined minimum, modifying the value of the electrical force signal sent to the actuator, and modifying a stored control parameter.

26 Claims, 6 Drawing Sheets

CONTROL COMMAND MODIFICATION TO MINIMIZE SATURATION EFFECTS FOR CONTROLLED FORCE APPLICATION

FIELD OF THE INVENTION

The present invention relates to an improvement in force generating actuator control design and specifically improves control of force generation in non-linear operating regions.

BACKGROUND OF THE INVENTION

Hydraulic systems have typically been the basis for generating force to such vehicle systems as braking systems, clutches, etc., especially automotive braking systems. Hydraulic systems are used to convert fluid pressure into linear and/or mechanical motion. Such systems allow the source of the hydraulic pressure to be positioned remotely from the cylinders that affect the braking action. These systems comprise an actuator, such as a brake pedal, a reservoir fluid that is responsive to pressure applied by the actuator, (such as a master cylinder) and means for converting the hydraulic pressure to a braking force, generally fluid cylinders. Mechanical braking pressure is achieved by utilizing the force of the depression of the brake pedal by the driver to increase the pressure on the master cylinder. Such systems are typically accompanied by a vacuum boost that multiplies the force supplied to the brake pedal, throughout the braking operation. The increased pressure in the master cylinder is then transmitted through fluid lines to the fluid cylinders. The fluid cylinders operate the calipers thereby forcing the calipers and brake pads against the rotors and/or drums which slows the vehicle by frictional force.

Hydraulic systems of the above-described type have many disadvantages. These include the large amount of volume and mass that the master cylinder vacuum booster, ABS modulator and hydraulic line add to the completed vehicle. Installation of standard hydraulic braking systems is also complicated and labor intensive. Additionally, the large number of parts and installation also adds to repair and maintenance issues as individual parts reach the end of their useful life. Standard hydraulic braking systems have also become dependent on the vacuum boost to assist in braking operations. However, vehicles such as electric or hybrid vehicles do not produce vacuum as a by-product of the vehicle operation. Thus vacuum boost is not an option on such vehicles.

Electric brake systems have been developed in order to overcome some of the hydraulic system disadvantages. While there are many variant forms, including electrical hydraulic systems, such an electrically operated brake system is also referred to as a brake-by-wire brake system (BBW). BBW describes the ability to activate vehicle wheel brakes via an electric signal generated by an onboard processor/controller as a result of input signals thereto. Brake torque is applied to the wheels without direct mechanical interaction between the vehicle's brake pedal and the wheel brake.

One particular type of BBW system operates when a driver inputs a force to the brake pedal. A force sensor and/or travel sensor attached to the pedal transmits an electronic signal to an electronic controller, which in turn sends the signal to the self contained braking device typically located at each wheel of the vehicle. One such system is a hybrid system wherein electric signals are used to generate the type and amount of braking force required at each wheel of the vehicle with electrical wires rather than standard hydraulic brake lines. Located at each corner of the vehicle is a self-contained module that receives the electrical signal and mechanically brakes the vehicle. The self-contained module utilizes an individual motor that drives a ball screw piston assembly that, in turn, pressurizes hydraulic brake fluid to ultimately apply the brake caliper to a rotor at that corner of the vehicle. Another type system employs self-contained electric caliper modules that utilize an individual motor to directly apply the brake caliper to the rotor without the use of hydraulics. These types of modular BBW systems significantly reduce assembly cost. The individual modules can be separately assembled prior to the manufacture of the vehicle. The modules then only need to be bolted to the automobile during the assembly process and plugged in using standard electrical connections. Finally, the elimination of hydraulic lines stretching throughout the vehicle as well as the elimination of the master cylinder booster, and ABS modulator reduces space requirements within the engine compartment.

Due to the modularity of the BBW system, each of the individual components is preferably kept relatively small while still meeting a baseline brake response. Such a system keeps the BBW module a manageable size and does not overextend the existing electrical system on a vehicle. A modular BBW system thus works well in most brake system applications. All brake systems have linear and non-linear ranges of operation. Previous brake systems employing a central master cylinder have typically been designed such that the expected range of operation falls within its linear operating range. Since the desire is to minimize the physical size of BBW systems, these systems must operate over a wider area of the available range. Thus, in addition to the linear range of the system, these systems must also operate within the system's non-linear range.

As in a standard hydraulic brake system, an operator pressing an input device such as a brake pedal generates the initial input to the braking system. However, instead of creating a system-wide hydraulic pressure signal to the individual brakes, pressing the brake pedal in a BBW system generates a corresponding electric input signal to a controller. This electrical input signal, in turn, is applied to a control law and a corresponding electric output signal is sent from the controller to the individual brakes. Since the BBW brake system operates over an entire non-linear range, previous methods of control law utilization are not practical. If only a linear control law is utilized, then operation in the non-linear range will cause brake system to either overshoot or result in a decreased response. Conversely, if a non-linear control law is designed for application by the controller, throughput requirements and sophistication of the controller are significantly increased. Neither option furthers the objective to have a brake system that is simple to control over both linear and nonlinear ranges of operation and maintains controller complexity at a minimum.

The present invention is aimed at one or more of the problems identified above.

SUMMARY OF THE INVENTION AND ADVANTAGES

In one aspect, the present invention includes a force generating apparatus for providing a force to a moving element based upon receipt of an electrical force signal. The force generating apparatus includes a force applying element coupled to the moving element for applying the force to the moving element and an actuator coupled to the force applying element for actuation thereof in response to receiving the electrical force signal. The force generating apparatus further includes a controller for determining when the force applying element is in an apply mode, determining the elapsed time until reversion to a normal mode, determining when the elapsed time is greater than a predefined minimum, modifying the value of the electrical force signal sent to the actuator, and modifying a stored control parameter.

Another aspect of the present invention is a method for modifying the electrical force signal to an actuator of a force generating apparatus wherein the force generating apparatus having a force applying element coupled to the moving element for applying the force and an actuator coupled to the force applying element for actuation thereof in response to receiving an electrical force signal from a controller. The method includes the steps of receiving a desired force actuation signal at the controller and then determining when the force generating apparatus is in an apply mode. Upon determining when the force generating apparatus is in the apply mode the length of time in the apply mode is then calculated. The calculated time value is compared to a predefined minimum associated with a normal mode and then modifying the electrical force signal according to a first predefined function when the length of time is greater than the predefined minimum. Finally, the modified electrical force signal is sent to the actuator.

Yet another aspect of the present invention is a method for modifying the electrical force signal to an actuator of a force generating apparatus. The force generating apparatus has a force applying element coupled to a moving element for applying the force and an actuator coupled to the force applying element for actuation thereof in response to receiving an electrical force signal from a controller. The method includes the steps of receiving a desired force actuation signal at the controller and then determining when the force generating apparatus is in an apply mode. The length of time the force generating apparatus is in the apply mode is calculated to obtain a time value which is then compared to a predefined minimum associated with a subsequently occurring mode other than an apply mode. The electrical force signal is modified according to a first predefined function when the calculated time value is greater than the predefined minimum. The modified electrical force signal is then sent to the actuator. The calculated time value is decremented by a predefined first constant to obtain a new time value. The new time value is compared to the predefined minimum. When the new time value is greater than the minimum time value incremented by a predefined second constant, a control law command value is modified by a second predefined function wherein the electrical force signal is at least partially a function of the control law command value. The method is reiterated in an automatic manner after every passage of a predefined time interval.

These and other features and advantages of the present invention will be further understood and appreciated by those skilled in the art by reference to the following specification, claims, and appended drawings.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DETAILED DESCRIPTION OF THE PREFERRED EMBODIMENT

Figure 1:
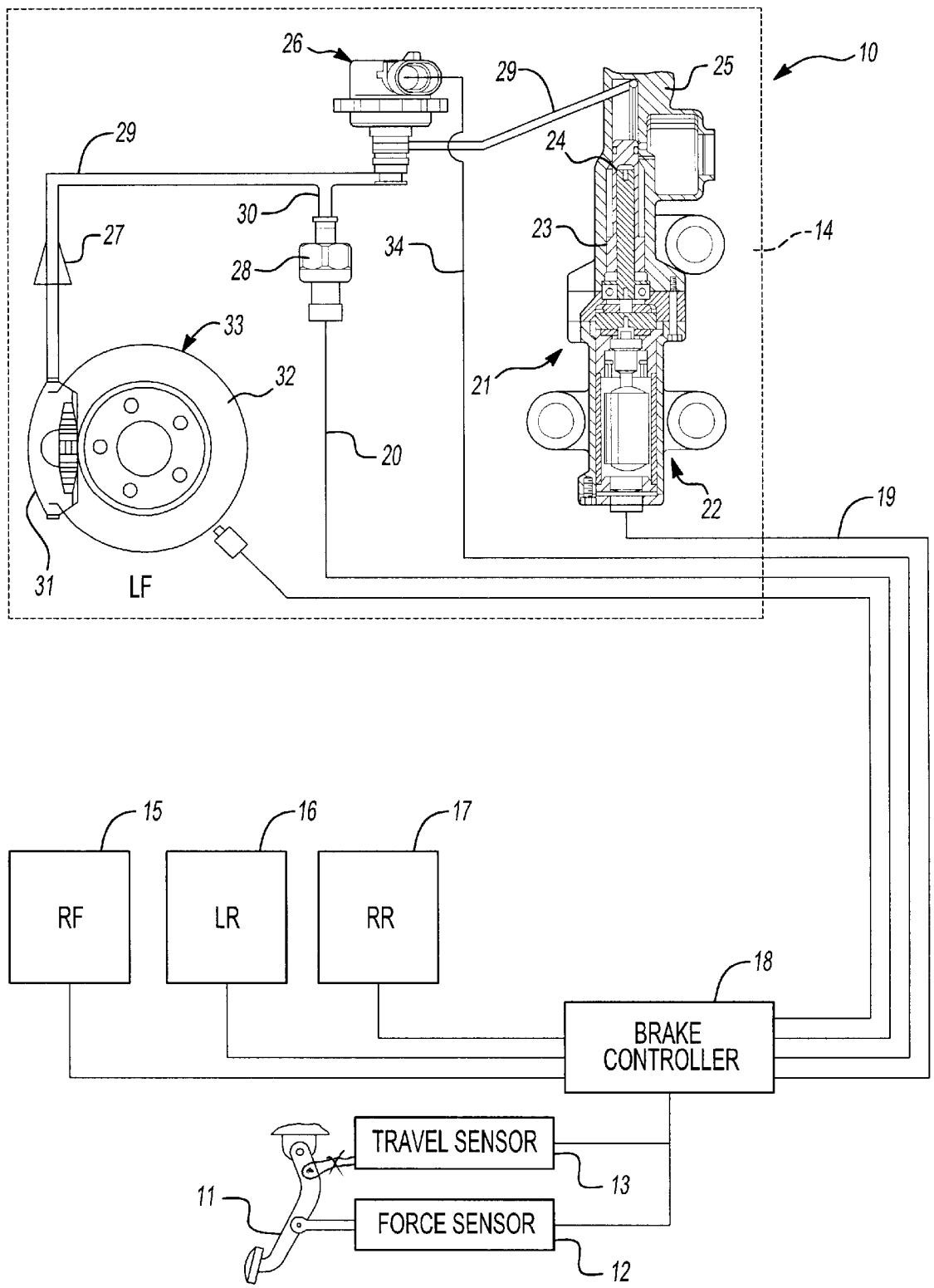
FIG. 1 is a schematic illustration of a braking system having self-contained electro-hydraulic modules at each wheel and including a controller incorporating the present invention.

Referring to the drawings, where the showings are for the purpose of illustrating the preferred embodiment of the invention only, and not for the purpose of limiting same, FIG. 1 schematically illustrates a force generating apparatus 10 embodied as a brake-by-wire braking system incorporating electro-hydraulic modules and a controller of the present invention. As shown the operator of the vehicle acts upon brake pedal 11. This force is applied to a force sensor 12 that in turn generates an electrical signal to a controller 18. Controller 18 processes the signal and sends a corresponding electrical signal to a left front corner brake module 14 of a vehicle. While FIG. 1 only shows the left front corner brake module 14, it will be appreciated that the brake signal is transmitted by controller 18 to all four corners of the vehicle, or each of the individual braking systems of the vehicle as the case may be.

A left front corner brake module 14 of FIG. 1 will now be described in detail. Corners 15, 16, and 17 are identical. Force sensor 12 and/or travel sensor 13 transmits a brake signal to an electronic control module 18 which via actuator signal line 19 is electrically connected to an actuator assembly 21 and specifically to a motor 22. Motor 22 drives a gear mechanism and ball screw assembly 23 that applies and releases a hydraulic piston 24 within an actuator body 25. A fluid line 29 extends from actuator body 25. Pressure transducer (or pressure sensor) 28 is located downstream of piston 24 and intersects primary line 29 via a port 30. During a normal brake apply and release displaced brake fluid flows within primary fluid line 29 and through outlet 27. The fluid pressure therein is transmitted to a force applying element 33 here shown as a wheel brake comprising a brake calipers 31 operating against rotor 32 in an apply and release manner to control the movement of a moving element such as a rotating wheel.

During normal braking operations, solenoid valve 26 is in a normally open state. Accordingly, the operator presses brake pedal 11 which is sensed by force sensor 12 and sends a signal or desired brake actuation signal to brake control module (or brake controller) 18. Brake controller 18 in turn generates a signal to actuate motor 22 and drive ball screw assembly 23 and hydraulic piston 24 to pressurize fluid line 29. Brake controller 18 receiving a pressure signal from pressure transducer 28 monitors the fluid pressure within fluid line 29. Braking of wheel brake 33 is accomplished by piston 24 displacing fluid through the fluid line 29. When the operator releases brake pedal 11, brake controller generates a signal to reverse motor 22 and ball screw assembly 23 thereby relieving pressure from line 29 and wheel brake 33.

As can be seen from FIG. 1, an optional solenoid valve can be located along fluid line 29 downstream of piston 24 and upstream of pressure transducer 28. Solenoid valve 26 is normally open. When brake controller 18 senses a prolonged application of brake pedal 11, such as encountered when waiting at a stoplight, a close signal is transmitted to solenoid 26 via solenoid signal line 34. Solenoid 26 closes and thereby maintains caliper 31 and fluid line 29 downstream of solenoid 26 in a pressurized state allowing the load on actuator 21 to be removed until brake controller 18 commands a new braking signal. When solenoid 26 is not present in brake system 10, electrical power continues to be applied to motor 22 thereby maintaining a desired pressure in fluid line 29.

Figure 2:
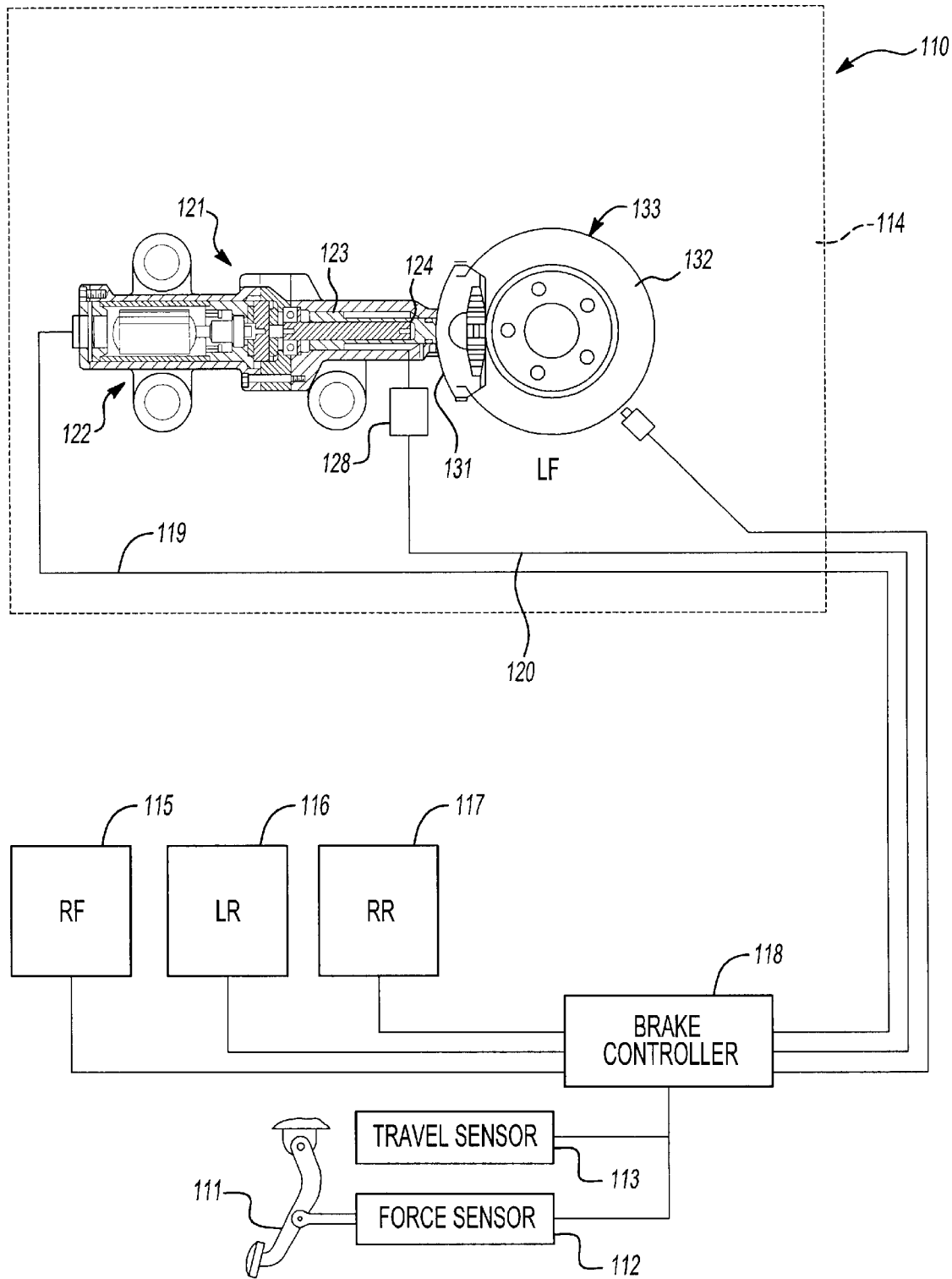
FIG. 2 is a schematic illustration of a braking system having self-contained electrically operated modules at each wheel and including a controller incorporating the present invention.

Turning now to FIG. 2, an alternate embodiment of a brake by wire braking system is shown generally at 110. Braking system 110 incorporates an electromechanical actuator 121 coupled to a brake 133 and a controller 118 of the present invention. As shown, the operator of the vehicle acts upon brake pedal 111, and as in system 10 described above, the force applied to the brake pedal 111 in turn is applied to force sensor 112. Force sensor 112 generates an electrical signal to a controller 118. Controller 118 processes the signal and sends a corresponding electrical signal to a left front corner brake module 114 of the vehicle. Corners 115, 116, and 117 are identical to brake module and are controlled in a like manner. Electromechanical actuator 121 includes a motor 122 which is electrically connected to brake controller 118 for receiving an electrical brake signal transmitted by brake controller 118. Motor 122 drives a gear mechanism and ball screw assembly 123 that mechanically advances and reverses link 124. Link 124 is coupled to wheel brake 133 for actuation of the wheel brake. Specifically, link 124 is coupled to brake caliper 131 such that when ball screw assembly 123 advances and releases link 124, caliper 131 is correspondingly applied and released from braking contact with rotor 132 mounted to the wheel to the vehicle. Those skilled in the art will readily recognize that brake drums and brake shoes can be substituted for the calipers and rotors discussed herein as another embodiment of a brake by wire system.

Figure 3:
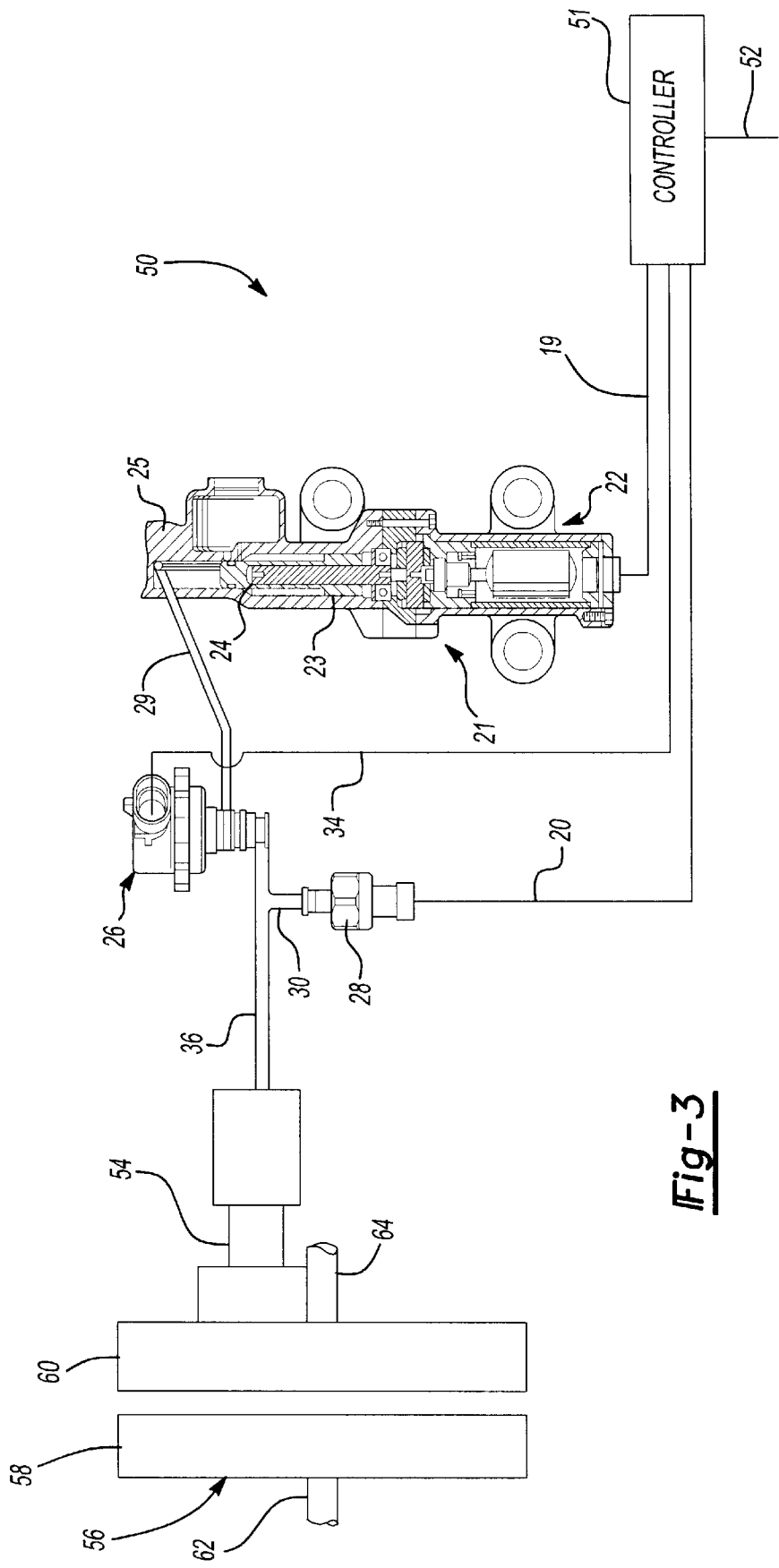
FIG. 3 is a schematic illustration of an electrically controlled transmission system.

Referring now to FIG. 3, a transfer case actuator system 50 for controlling the torque split between the front and rear drive axles of a four-wheel drive vehicle is shown. Actuator 21, solenoid valve 26, transducer 28 and their operation and respective interconnections are the same as for brake system 10, and are thus numbered the same. A controller 51 receives a signal on line 52 for engagement or disengagement of transfer clutch 56 wherein controller 51 sends the desired force actuation signal to actuator 21. Fluid line 36 interconnects solenoid 26 with piston 54. As fluid is forced into line 36, piston 54 in turn acts upon plate 60 of transfer clutch 56, to force plate 60 into operational engagement with plate 58, thus transferring torque from input shaft 62 to output shaft 64.

Turning now to operation of controllers 18, 51, and 118, for purposes herein all controllers operate in the same manner and thus for convenience only the operation of controller 18 will be discussed. Those skilled in the art will recognize that the methods applied to controller 18 can also be utilized in controllers 51 and 118. Controller 18 receives electrical inputs that are generated as a result of the vehicle operator depressing brake pedal 11. Brake controller 18 then takes the electrical signal which is a desired brake actuation signal and calculates the appropriate electrical brake signal to motor 22 for appropriate actuation of brake 33. Brake module 14 may not operate in a linear fashion, and for appropriate control thereof brake controller 18 would typically require application of an appropriate non-linear control law. However, since application of non-linear control laws add significant complexity to operation of brake controllers 18 it has become desirable to adapt and apply linear control laws such as Proportional Integral Derivative (PID) or other standard control laws that are well known in control law theory.

In order to use a linear control law in a non-linear operating region, the non-linear operation must be approximated as a linear function. Since approximating the entire non-linear function as a linear function with a single set of gains applied thereto necessarily creates a high degree of error, brake controller 18 applies the linear control law to a specific region associated with a particular brake operational mode. By application in this manner, brake controller 18 more closely approximates the non-linear characteristics of the braking system with a series of linear approximations, each linear approximation being associated with a specific braking mode. An appropriate braking is then determined based upon the linear approximation for that mode and is sent to the brake module.

Figure 4:
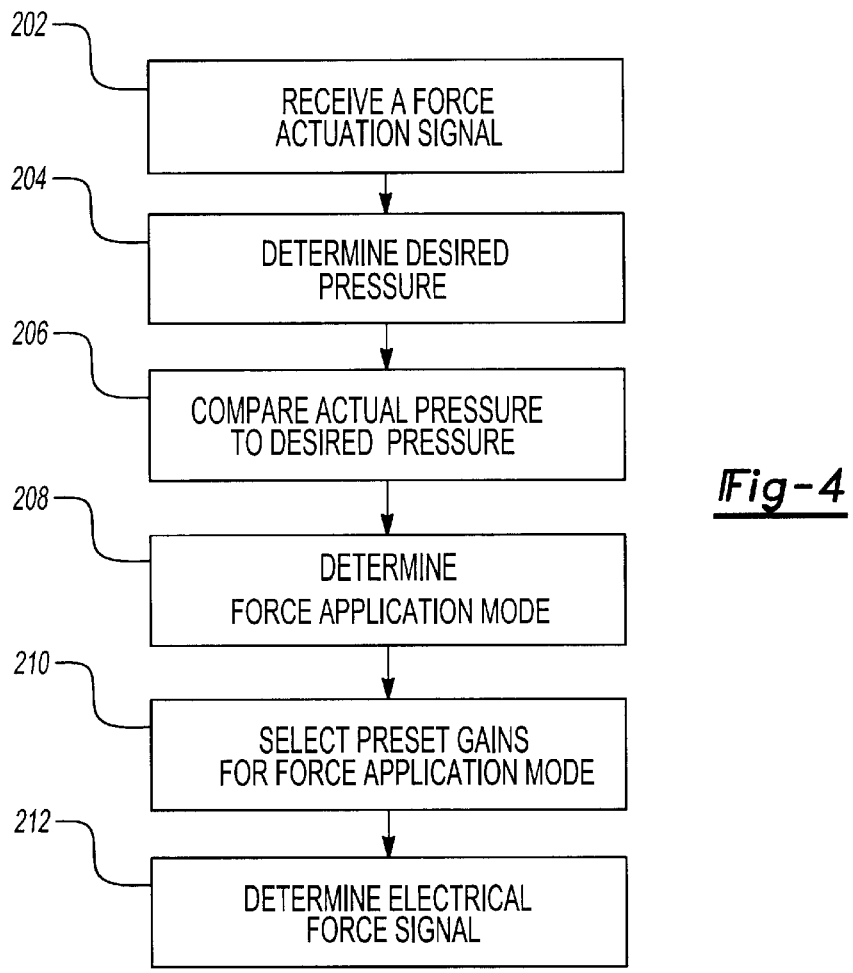
FIG. 4 is a flowchart of a method for operating a force generating apparatus, according to an embodiment of the present invention.

Turning now to FIG. 4, an embodiment thereof shows the process of receiving a force actuation signal and determining therefrom an electrical force signal to be transmitted to the brake module 14. In a first control block 202 the brake controller 18 receives a force actuation signal. In a second control block 204, the force actuation signal is translated into a desired pressure or force. Control block 206 represents the comparison of the desired pressure or force to the actual pressure or force being applied to the force applying element. The actual pressure is a function of the hydraulic pressure sensed by pressure transducer 28 in brake module 14. The actual pressure is then transmitted to brake controller 18. The controller compares the actual pressure to the desired pressure by calculating the difference between the two pressures, and then establishing the differences as an error.

In control block 208 the controller determines the specific force application mode based upon the error and the desired pressure. The desired pressure establishes whether the system is being operated in the low, medium, or high regions by establishing predefined bracketed thresholds of pressures or forces for each region. Similarly, if the error is greater than a threshold error the force applying element or brake is designated as being in an apply mode; if the pressure error is less than the error threshold the system is in a release mode; and if the pressure error is approximately equal to the threshold error the system is in a normal mode. Thus, a total of nine force application modes (low apply, low release, low normal, medium apply, medium release, medium normal, high apply, high release, or high normal) can be established in this manner. Those experienced in the art will readily recognize that the regions can be divided into more or fewer sub-regions for the establishment of a greater or fewer number of modes.

Controller 18 includes a table of preset gains for application to the linear control law. Each of the individual gains in a set are established to most closely approximate the linear control law in that region associated with the particular mode of brake operation. Thus, upon determining the force application mode, the controller selects the preset gains for that mode and applies these gains to the linear control law therein determining the electrical force signal to be sent to the brake module 14.

Brake module 14 is not instantly responsive to the electrical brake signal sent by the controller to the brake module. There is a certain degree of lag time during which the brake module 14 receives the electrical signal, activates the motor in actuator 21, and applies the commanded force to the force applying element. In order to prevent conflicting signals from being sent to brake module 14 within the response time for the first sent signal, a timing function is introduced to the controller operation.

Figure 5:
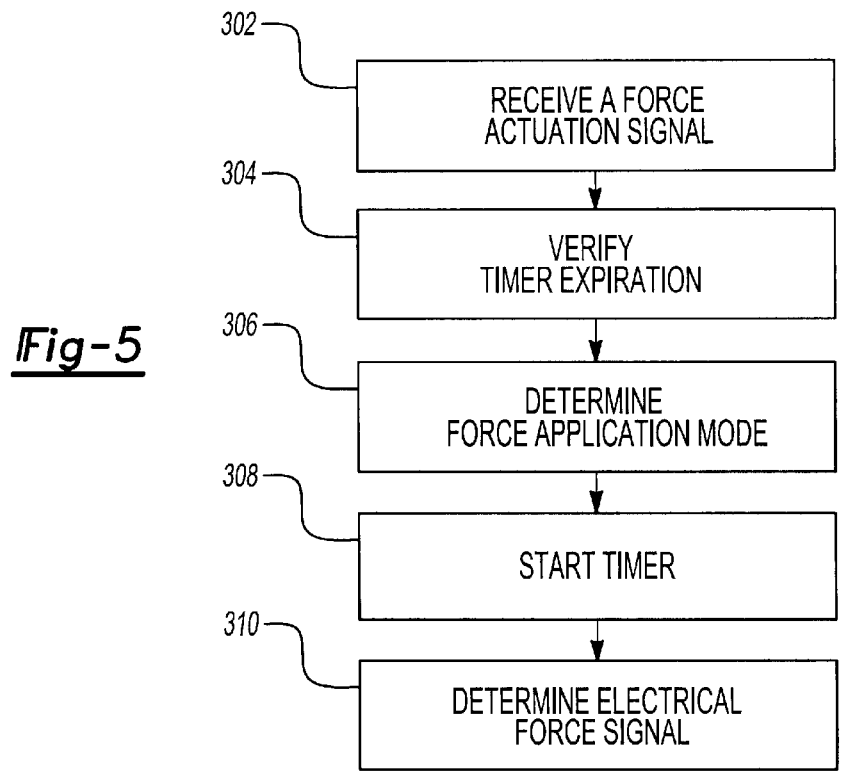
FIG. 5 is a flowchart of a method for determining the operations region of the force generating apparatus and the corresponding gains to be applied to the linear control law for that region.

FIG. 5 shows an application of the timing function. In control block 302 the controller receives a force actuation signal, in control block 304 the controller verifies that the timing function has expired, and then in control block 306 the force application mode is determined as discussed above. In control block 308 the timer is started after the force application mode has been determined, and then in control block 310 the electrical force signal to be sent to brake module 14 or 114 is determined. The timing function from control block 308 continues to run for a predefined time period that is dependent upon the response characteristics of individual brake module 14. In the disclosed embodiments, the timing function is on the order of 20 milliseconds, although those experienced in the art will recognize that different time durations may be selected based upon the needs and requirements of the system to which it is applied. The electrical signal to be sent to the brake module is determined and maintained until the timing function has expired. In this manner, the controller 18 will maintain the determined braking mode for the duration of the timing function. Upon expiration of the timing function, a new mode can be determined and a new braking signal is determined and sent to the brake actuator.

When the brake system is in one of the apply modes, i.e. low apply, medium apply, or high apply, the commanded brake forces sent from the brake controller 18 to the actuator motor 22 can increase at a rapid rate. This is generally known as a fast mode apply (FMA). A fast mode apply generally results in a rapid increase in the commanded braking force and is likened to an input spike. When such an input spike occurs, the brake assembly 14 reaches the saturation area of its operational spectrum and can overshoot the desired brake force or brake output desired. When the actuator 21 reaches saturation it is no longer approximated by the linear control law even when the linear control law is approximated according to the predefined gains associated with the particular apply mode of brake operation. Thus, when operating in an FMA situation the commanded electrical brake signal must be further modified to prevent the potential overshoot of the actuator.

Figure 6:
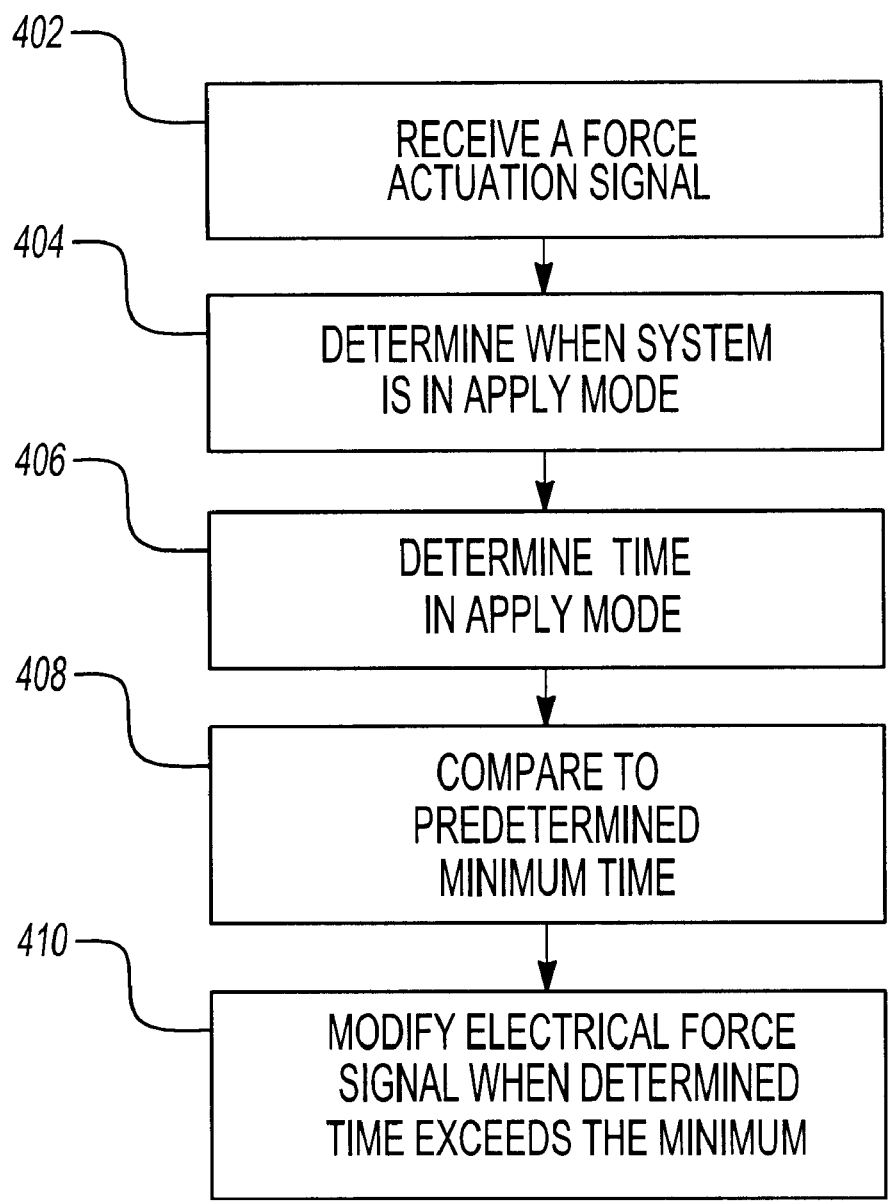
FIG. 6 is a flowchart of a method for modifying the force signal sent to the force generating apparatus to compensate for overshoot of the actuator during a fast apply of the force applying element.

Turning now to FIG. 6, an embodiment of a process for modifying an electrical brake signal to minimize overshoot of the actuator motor 22 is shown. In a first control block 402, the brake controller 18 receives a brake actuation signal. In a second control block 404, the controller determines when the braking system is in an apply mode. This determination corresponds to control block 306 of FIG. 5 where the braking mode is determined as discussed above. However, control block 404 is limited to recognizing when the braking system is in one of the apply modes outlined above. In control block 406, the controller monitors the system while in apply mode until the system exits the apply mode or reaches a preset maximum time. The determined time is then compared to a predetermined minimum time associated with a mode other than an apply mode in control block 408. In control block 410, if the determined apply mode time is greater than the predetermined minimum time the electrical brake signal is modified by a predefined function. Application of the predefined function results in a modified electrical brake signal corresponding to a smaller brake output.

Figure 7:
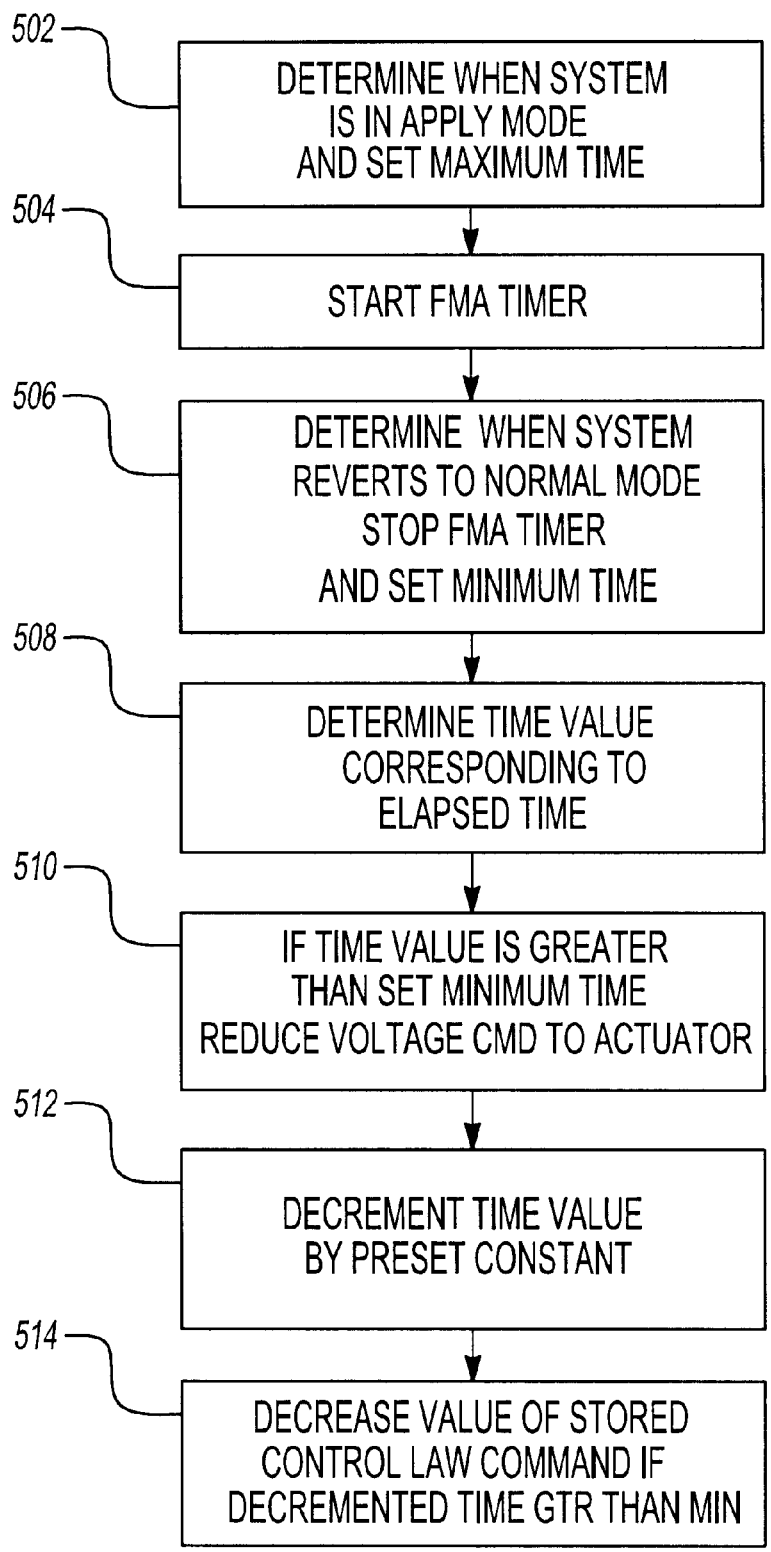
FIG. 7 is a flowchart of a method for modifying the force signal sent to the force generating apparatus to compensate for overshoot of the actuator during a fast apply of the force applying element further incorporating a timing function.

A more preferred embodiment of this process is shown in FIG. 7. In control block 502 the controller determines when the system is in one of the apply modes and corresponds to the mode recognition discussed above and as shown in FIG. 4. Upon sensing an apply mode, the controller sets a maximum time wherein the maximum time is a predefined value and further wherein each apply mode has a specific predefined maximum time associated therewith. In control block 504, the controller starts an FMA timer to begin counting the time while the system is in the apply mode. In control block 506, the controller determines when the system reverts to one of the three specified normal modes, and upon sensing reversion to a normal mode the controller stops the FMA timer and sets a minimum time value. The set minimum time is a predefined time value and each of the individual normal modes has a specific predefined minimum time associated therewith. In control block 508, the controller compares the start and stop of the FMA timer to determine a time value corresponding to the elapsed time the system was in apply mode. In control block 510, the controller compares the time value to the set minimum time, and if the time value is greater than the set minimum time, the voltage command corresponding to the electrical brake signal being sent to the actuator is reduced according to a predefined function. In the preferred embodiment, the voltage command is set to correspond to an actuator pressure divided by a predefined constant. Those skilled in the art will recognize that the modification function can be established to meet the specific needs and characteristics of the system to which it is applied. In control block 512, the time value is decremented by a preset constant. In control block 514, the decremented time value is compared to the preset minimum and if the decremented time value is greater than the minimum, the stored control law command from which the electrical brake signal is at least partially derived is decreased according to a predetermined function. In the preferred embodiment, the command value is divided by a constant to reduce its value and thereby the next calculated electrical brake signal will be correspondingly reduced. This modification of the control law command is only necessary when the time value is significantly larger than the set minimum time. The process of FIG. 7 is automatically reiterated by controller 18 at preset intervals and will continue to reduce the voltage command signal to the actuator motor 22 until the time value has been decremented to a value less than the set minimum. Once the time value has been decremented below the set minimum time, the FMA timer is reset to 0 until another apply mode is determined in a subsequent iteration.

In the foregoing description, the invention has been described with reference to the preferred embodiment. Those skilled in the art will readily appreciate that modifications may be made to the invention without departing from the concepts disclosed herein. Such modifications are to be considered as covered by the following claims, unless the claims by their language expressly state otherwise.

The invention claimed is:

1. A force generating apparatus for providing a force to a moving element based upon receipt of an electrical force signal, comprising:

a force applying Element coupled to the moving element and selectively operable in an apply mode, a release mode, and a normal mode, for applying the force to the moving element in the apply mode, removing force from the moving element in the release mode, and neither applying nor removing a force on the moving element in the normal mode;

an actuator coupled to said force applying element for actuation thereof in response to receiving the electrical force signal; and, a controller for determining when the force applying element is in the apply mode, determining the elapsed time until reversion to the normal mode, determining when the elapsed time is greater than a predefined minimum, modifying the value of the electrical force signal sent to the actuator only after the elapsed time exceeds the predefined minimum, and modifying a stored control parameter.

2. A force generating apparatus according to claim 1 wherein said force applying element comprises a caliper and a rotor.

3. A force generating apparatus according to claim 2 further including a transducer coupled to said actuator for sensing a force applied to said force applying element and further coupled to said controller for delivering an actual force signal to said controller.

4. A force generating apparatus according to claim 3 wherein said actuator includes a motor responsive to said electrical force signal and a gear-ball screw assembly coupled to said motor.

5. A force generating apparatus according to claim 4 wherein said actuator defines an apply chamber and further includes a piston within said apply chamber and coupled to said gear-bail screw assembly for selectively increasing and decreasing a fluid pressure therein.

6. A force generating apparatus according to claim 5 wherein said caliper is fluidically coupled to said apply chamber and further is responsive to the increasing and decreasing fluid pressure.

7. A force generating apparatus according to claim 4 wherein said gear-ball screw assembly is mechanically coupled to said caliper.

8. A force generating apparatus according to claim 1 wherein said force applying element comprises a shoe and a drum.

9. A force generating apparatus according to claim 1 wherein said elapsed time is calculated by a timing function from a start of said apply mode to a start of a normal mode.

10. A force generating apparatus according to claim 9 wherein said predefined minimum time is a predefined time value associated with a determined normal mode.

11. A force generating apparatus according to claim 10 wherein said value of the electrical force signal is reduced as a function of a first predefined constant.

12. A force generating apparatus according to claim 1 wherein said stored control parameter is not modified when said elapsed time is within a preset value of said predefined minimum time.

13. A force generating apparatus for providing a force to a moving element based upon receipt of an electrical force signal, comprising:

a force applying element coupled to the moving element for applying the force to the moving;

an actuator coupled to said force applying element for actuation thereof in response to receiving the electrical force signal; and a controller for determining when the force applying element is in an apply mode, determining the elapsed time until reversion to a normal mode, determining when the elapsed time is greater than a predefined minimum, modifying the value of the electrical force signal sent to the actuator, and modifying a stored control parameter;

wherein said elapsed time is calculated by a timing function from a start of said apply mode to a start of said normal mode, said predefined minimum time is a predefined time value associated with a determined normal mode, said value of the electrical force signal is reduced as a function of a first predefined constant, and said stored control parameter is modified as a function of a second predefined constant.

14. A force generating apparatus for providing a force to a moving element based upon receipt of an electrical force signal, comprising:

a force applying element including a caliper and rotor coupled to the moving element for applying the force to the moving element;

an actuator coupled to said force applying element for actuation thereof in response to receiving the electrical force signal, said actuator including a motor responsive to said electrical force signal and a gear-ball screw assembly coupled to said motor; said actuator also defining an apply chamber and further includes a piston within said apply chamber and coupled to said gear-ball screw assembly for selectively increasing and decreasing a fluid pressure therein;

said caliper, of the force applying element, fluidically coupled to said apply chamber and further responsive to the increasing and decreasing fluid pressure;

a controller for determining when the force applying element is in an apply mode, determining the elapsed time until reversion to a normal mode, determining when the elapsed time is greater than a predefined minimum, modifying the value of the electrical force signal sent to the actuator, and modifying a stored control parameter;

a transducer coupled the actuator for sensing a force applied to said force applying element and further coupled to said controller for delivering an actual force signal to said controller; and a solenoid between said apply chamber and said caliper for selectively isolating and connecting said caliper from said fluid pressure in said apply chamber.

15. A method for modifying the electrical force signal to an actuator of a force generating apparatus, the force generating apparatus having a force applying element coupled to the moving element for applying the force and an actuator coupled to the force applying element for actuation thereof in response to receiving an electrical force signal from a controller, the method including the steps of:

receiving a desired force actuation signal at the controller;

determining when the force generating apparatus is in an apply mode;

calculating the length of time the force generating apparatus is in the apply mode to obtain a time value;

comparing the calculated time value to a predefined minimum associated with a subsequently occurring mode other than an apply mode; and modifying the electrical braking signal according to a first predefined function when the time value is greater than the predefined minimum; and sending the modified electrical force signal to the actuator.

16. The method according to claim 15 wherein said determining step determines one of a plurality of apply modes.

17. The method according to claim 16 wherein said calculating step comprises the steps of:
  starting a timer when an apply mode is determined;
  stopping the timer when the apply mode is terminated; and
  calculating the time value as a function of timer start and timer stop.

18. The method according to claim 17 wherein said timer stopping step occurs upon sensing transition to one of a selected plurality of modes other than an apply mode.

19. The method according to claim 18 further including after said calculating step the step of:
  limiting the calculated time value to a predefined value associated with the determined specific apply mode.

20. The method according to claim 19 further including after the sending step the steps of:
  decrementing by a predefined first constant the calculated time value to obtain a new time value;
  comparing the new time value to the predefined minimum;
  modifying a control law command value by a second predefined function wherein the electrical braking signal is at least partially a function of the control law command value, said modifying occurring when the decremented time value is greater than the minimum time value incremented by a predefined second constant.

21. The method according to claim 15 including after the modifying step the step of:
  reiterating said method in an automatic manner after every passage of a predefined time interval.

22. A method for modifying the electrical force signal to an actuator of a force generating apparatus, the force generating apparatus having a force applying element coupled to a moving element for applying the force and an actuator coupled to the force applying element for actuation thereof in response to receiving an electrical force signal from a controller, the method including the steps of:
  receiving a desired force actuation signal at the controller;
  determining when the force generating apparatus is in an apply mode;
  calculating the length of time the force generating apparatus is in the apply mode to obtain a time value;
  comparing the calculated time value to a predefined minimum associated with a subsequently occurring mode other than an apply mode;
  modifying the electrical force signal according to a first predefined function when the time value is greater than the predefined minimum;
  sending the modified electrical force signal to the actuator;
  decrementing by a predefined first constant the calculated time value to obtain a new time value;
  comparing the new time value to the predefined minimum;
  modifying a control law command value by a second predefined function wherein the electrical force signal is at least partially a function of the control law command value, said modifying occurring when the new time value is greater than the minimum time value incremented by a predefined second constant;
  reiterating said method in an automatic manner after every passage of a predefined time interval.

23. A force generating apparatus for providing force to a moving element based upon receipt of an electrical force signal, the force generating apparatus comprising:
  a pressure actuated force applying element coupled to the moving element and selectively operable in force application modes including an apply mode, a release mode, and a normal mode, for applying the force to the moving element in the apply mode, removing force from the moving element in the release mode and neither applying nor removing force on the moving element in the normal mode;
  an actuator coupled to the force applying element for providing an actuation pressure thereto in response for receiving the electrical force signal; and
  a controller for receiving a force actuation signal indicative of a desired level of force to be provided to the moving element and determining a desired actuation pressure in response to a force application signal; for receiving an actual actuation pressure signal indicative of the force being provided to the moving element and comparing the actual pressure to the desired pressure; for determining a force application mode of the force generating apparatus; for selecting a preset gain for the determined force application mode; and for determining the electrical force signal from the preset gain for the determined force application mode; for determining when the force applying element is in the apply mode, determining the elapsed time until reversion to the normal mode, determining when the elapsed time is greater than a predefined minimum, modifying the value of the electrical force signal sent to the actuator only after the elapsed time exceeds the predefined minimum; and modifying a stored control parameter.

24. A method for operating a force generating apparatus for providing force to a moving element based upon receipt of an electrical force signal, the method comprising:
  receiving a force actuation signal;
  determining a desired pressure in response to the force application signal;
  receiving an actual pressure signal;
  comparing the actual pressure to the desired pressure;
  determining a force application mode of the force generating apparatus, from selectable force application modes including an apply mode, a release mode, and a normal mode, for applying the force to the moving element in the apply mode, removing force from the moving element in the release mode and neither applying nor removing fore on the moving element in the normal mode;
  selecting a preset gain for the determined force application mode;
  determining the electrical force signal from the preset gain for the determined force application mode; and
  determining when the force applying element is in the apply mode, determining an elapsed time until reversion to the normal mode, determining when the elapsed time is greater than a predefined minimum, modifying the value of the electrical force signal sent to the actuator only after the elapsed time exceeds the predefined minimum, and modifying a stored control parameter.

25. The method of claim 24 further comprising starting a timer upon determining the start of an apply force application mode, and stopping the timer upon a reversion to a normal force application mode.

26. The method of claim 25 further comprising verifying expiration of a predetermined elapsed time of the timer upon receiving the force actuation signal, and if the timer has not expired, maintaining the electrical force signal until the timer has expired.

* * * * *